United States Patent [19]
Okisaki et al.

[11] Patent Number: 6,017,987
[45] Date of Patent: Jan. 25, 2000

[54] FIRE-RETARDANT POLYMER COMPOSITION

[75] Inventors: Fumio Okisaki, Mie; Akinori Hamada, Yamaguchi; Shunichi Endo; Genichiro Ochiai, both of Ibaraki, all of Japan

[73] Assignee: Tosoh Corporation, Yamaguchi, Japan

[21] Appl. No.: 09/017,241

[22] Filed: Feb. 2, 1998

Related U.S. Application Data

[63] Continuation of application No. 08/609,902, Feb. 29, 1996, Pat. No. 5,760,115.

[30] Foreign Application Priority Data

Mar. 3, 1995 [JP] Japan ........................... 7-44375

[51] Int. Cl.$^7$ ................ C08K 3/10; C08K 3/04; C08K 3/22
[52] U.S. Cl. ............... 524/408; 524/409; 524/432; 524/433; 524/495; 524/496; 252/609; 252/606; 523/179; 523/218
[58] Field of Search .................... 524/261, 495, 524/496, 584, 586, 566, 605, 779, 786, 409, 408, 405, 432, 433, 437, 406; 528/485, 487, 488, 489, 490; 252/606, 609, 378 R; 523/205, 207, 179, 200, 218; 521/54, 99

[56] References Cited

U.S. PATENT DOCUMENTS

| | | | |
|---|---|---|---|
| 4,694,030 | 9/1987 | Von Bonn et al. | 523/179 |
| 4,698,369 | 10/1987 | Bell | 521/99 |
| 4,791,160 | 12/1988 | Kato et al. | 524/322 |
| 4,971,726 | 11/1990 | Maeno et al. | 252/511 |
| 4,977,194 | 12/1990 | Haas et al. | 521/99 |
| 5,023,280 | 6/1991 | Haas et al. | 521/106 |
| 5,124,367 | 6/1992 | Baker et al. | 521/107 |
| 5,409,961 | 4/1995 | Green | 521/78 |
| 5,432,219 | 7/1995 | Shiueh et al. | 524/291 |
| 5,432,225 | 7/1995 | Nakamura et al. | 524/495 |
| 5,567,763 | 10/1996 | Madan et al. | 524/701 |

FOREIGN PATENT DOCUMENTS

| | | | |
|---|---|---|---|
| 0192888 | 9/1986 | European Pat. Off. | C08J 9/00 |
| 6440588 | 2/1989 | Japan . | |
| 3041163 | 2/1991 | Japan . | |
| 6025476 | 2/1994 | Japan . | |
| 6073251 | 3/1994 | Japan . | |
| 2226033 | 6/1990 | United Kingdom | C08K 3/00 |
| WO9111498 | 8/1991 | WIPO | C09K 21/02 |

OTHER PUBLICATIONS

Database WPI–Derwent Publications Ltd. London, GB; AN 87–119220 (1987).
Database WPI–Derwent Publications Ltd. London, GB; AN 89–08997 (1989).
Database WPI–Derwent Publications Ltd. London, GB; AN 91–097794 (1991).
Database WPI–Derwent Publications Ltd. London, GB; AN 91–09773 (1991).
Derwent Abstract No. 94–124183 entitled: "Flame–retardant resin compsn. for automobile industry etc.—comprises styrene resin, red phosphorus and graphite rapidly expanding on heating" (1994).
Derwent Abstract No. 94–072057 entitled: Flame–resistant polyolefin resin compsn. not evolving corrosive gases—contg. red phosphorus heat expansible graphite and phsophorus cpds. (1994).
Hawley's Conensed Chemical Dictionary, 11th Ed. Van Nostrand Reinhold Comp. N.Y. (1987), citation "elastomer" as found on pp. 453–454.

*Primary Examiner*—Joseph D. Anthony
*Attorney, Agent, or Firm*—Sughrue, Mion, Zinn, Macpeak & Seas, PLLC

[57] ABSTRACT

A novel fire-retardant polymer composition is provided which comprises 100 parts by weight of a polymer such as polyolefins and polystyrenes, 1–30 parts by weight of an oxide or a complex oxide of metals such as antimony, boron, and molybdenum, and 1–30 parts by weight of heat-expandable graphite. The fire-retardant polymer composition emits less amounts of smoke and corrosive gas on burning with the characteristics of the polymer material kept unimpaired.

16 Claims, No Drawings

FIRE-RETARDANT POLYMER COMPOSITION

This is a continuation of application Ser. No. 08/609,902 filed Feb. 29, 1996 now U.S. Pat. No. 5,760,115.

BACKGROUND OF THE INVENTION

1. Field of the Invention

The present invention relates to a polymer material which has excellent fire-retardancy, and emits less corrosive gas and less smoke on burning.

2. Description of the Related Art

Polymer materials are desired to be fire-retardant to prevent fire accident or fire spreading in use for insulating materials such as electric wires and cables; sheath materials; enclosures and internal parts of electric, electronic, and office automation apparatuses; interior materials of vehicles; building materials, and so forth. Many polymer materials for such uses are enforced to be fire retardant by legislation. For fire retardancy of polymer materials, known fire-retardant additives include halogen type fire-retardant additives, magnesium hydroxide, aluminum hydrozide, red phosphorus, and phosphorus compounds. These fire-retardant materials, however, are not perfect, and have disadvantages below.

The halogen type fire-retardant additives, which give a high level of fire retardancy (for example, UL-94V-0, V-1, or V-2) by addition in a small amount, generate soot or smoke in a large amount on burning. Further, the halogen type fire-retardant additives emit more or less acidic substances such as a hydrogen halide by heat of processing or at the time of fire accident, which would cause corrosion of the machines for resin processing, or produce adverse effects on human health or apparatuses in the vicinity of a fire site.

Metal hydroxides as the fire retardant, such as magnesium hydroxide and aluminum hydroxide, are required to be added to the resin in a larger amount, although they emit neither smoke nor corrosive gas. The addition thereof in a larger amount will impair the mechanical strength, light-weight, and other favorable characteristics of the polymer.

The phosphorus type fire-retardant additives such as red phosphorus and phosphoric acid esters are effective in a small amount for polyamides, polyesters, polyphenylene oxides and other engineering plastics. However, they are less effective for fire retardation of general purpose polymers such as polyolefins and polystyrenes.

Therefore, a fire-retardant additive is demanded which contains no halogen, emits less smoke and less corrosive gas, and is effective in a smaller amount of addition. Promising techniques therefor have been disclosed in which heat-expandable graphite and a synergist are used in combination. For example, Japanese Patent Laid-Open Publication 6-73251 discloses fire-retardation of polystyrene by addition of a small amount of combination of red phosphorus and heat-expandable graphite. Japanese Patent Laid-Open Publication 6-25476 discloses fire-retardation of polyolefin by addition of a small amount of combination of red phosphorus or a phosphorus compound with heat-expandable graphite.

However, the red phosphorus itself is a substance under control as a dangerous object by Japanese Fire Protection Law, and is not necessarily easily handleable in storage, transportation, and blending with a polymer. Most of phosphorus compounds are low-melting, and is not necessarily easily blendable with a polymer.

The present invention has been accomplished to solve the above problems, and intends to provide a fire-retarding technique for a resin by use of a combination of heat-expandable graphite and a novel synergistic material without using red phosphorus or a phosphorus compound.

SUMMARY OF THE INVENTION

The present invention has been accomplished, after comprehensive investigations, based of the findings that a specific metal oxide is synergistic with heat-expandable graphite in fire retardation.

The present invention intends to provide a fire-retardant polymer composition which has excellent fire-retardancy, and emits less corrosive gas and less smoke on burning.

The fire-retardant polymer composition of the present invention comprises three components A, B, and C below essentially:

(A) 100 parts by weight of a polymer, (B) 1 to 30 parts by weight of heat-expandable graphite, and (C) 1 to 30 parts by weight of a metal oxide, wherein the polymer (A) is one or more polymers selected from the group of polyolefins, polystyrenes, elastomers, polyurethanes, and polysiloxanes; the heat-expandable graphite (B) changes the specific volume thereof on rapid heating from room temperature to 800–1000° C. by 100 mL/g or more; and the metal oxide (C) is an oxide or a complex oxide containing one or more metals selected from the group of antimony, bismuth, zirconium, molybdenum, tungsten, boron (excluding borax), aluminum, magnesium (excluding magnesium oxide for polyolefins and/or polystyrenes as the polymer), and zinc.

DETAILED DESCRIPTION OF THE PREFERRED EMBODIMENT

The fire-retardant polymer composition of the present invention comprises three components A, B, and C below essentially:

(A) 100 parts by weight of a polymer, (B) 1 to 30 parts by weight of heat-extensible graphite, and (C) 1 to 30 parts by weight of a metal oxide, The polymer, Component A, of the composition of the present invention is one or sore of polymers selected from the group of polyolefins, polystyrenes, elastomers, polyurethanes, and polysiloxanes.

The polyolefin employed in the present invention is mainly constituted of one or more of ethylene, propylene, and other olefinic monomers. The polyolefin includes high-density polyethylenes, low-density polyethylenes, linear low-density polyethylenes, polypropylenes, polybutenes, polymethylpentenes, ethylene-propylene copolymers, ethylene-vinyl ester copolymers, copolymers of ethylene with (meth) acrylic acid or derivative thereof.

The polystyrene in the present invention is a polymer produced from a styrene type monomer including styrene, α-methylstyrene, vinyltoluene vinylnaphthalene, and so forth. The polystyrene includes homopolymers of styrene, rubber-modified high-impact polystyrenes (hereinafter referred to as "HIPS"), acrylonitrile-butadiene-styrene copolymers (hereinafter referred to as "ABS"), and acrylic rubbers and etnylene-propylene copolymers grafted with an acrylic monomer and a styrenic monomer.

The elastomer in the present invention includes hydrocarbon type elastomers such as natural rubbers (hereinafter referred to as "NR rubber"), polybutadiene styrene-butadiene rubbers (hereinafter referred to as "SBR rubber"), polyisoprenes, othylene-proylene rubbers, nitrile rubbers, acrylate rubbers, butyl rubbers, epichlorohydrin rubbers, styrene-butadiene-styrene block copolymers, styrene-isoprene-styrene block copolymers, styrene-ethylene-butene-styrene block copolymers, and hydrogenated SBR.

The polyurethane in the present invention includes flexible polyurethane foams, rigid polyurethane foams, polyurethane fibers, and polyurethane paints, which are produced from an isocyanate such as a diisocyanate and a polyhydric alcohol such as polypropylene glycol.

The polysiloxane in the present invention includes polyorganosiloxanes having a side chain of alkyl, alkenyl, phenyl, or the like, specifically exemplified by silicone elastomers, room temperature-curing silicone rubbers, cold-setting silicone elastomers, silicone sealants, and silicone resins.

The polymer employed in the present invention is not limited to a single polymer, but may be a mixture of two or more thereof or with other polymer or polymers according to desired properties of the polymer.

Component B of the composition of the present invention is heat-expandable graphite. The heat-expandable graphite is derived from natural graphite or artificial graphite, and extpands on rapid heating from room temperature to 800–1000° C. in the c-axis direction of the crystal with the specific volume change of not less than 100 mL/g by the temperature change. This expandability is desirable because the one exhibiting the specific volume change of not less than 100 mL/g by the rapid heating gives much more fire retardancy than the one of less than 100 mL/g. The expandability in the present invention means the difference of the specific volume (mL/g) after the heating from that at room temperature.

The expandability is measured specifically as follows. A quartz beaker is heated preliminarily to 1000° C. in an electric furnace. Two grams of heat-expandable graphite is introduced into this quartz beaker quickly, and the quartz beaker is placed immediately in the electric furnace for 10 seconds to cause expansion of the graphite. The weight of 100 mL of the expanded graphite is measured to obtain the loosened apparent specific gravity (g/mL).

[Specific volume]=1/[Loosened apparent specific gravity]

Separately, the specific volume of the unheated heat-expandable graphite is obtained at room temperature similarly.

[Expandability]=[Specific volume after heating]−[Specific volume at room temperature]

The heat-expandable graphite of the present invention expands by heating only in the c-axis direction, but expands little in the a-axis direction and the b-axis direction according to electron microscopical observation.

The process for producing the heat-expandable graphite of the present invention is not specially limited. It can be obtained, for example, by oxidation treatment of natural-graphite or artificial graphite. The oxidation is conducted, for example, by treatment with an oxidizing agent such as hydrogen peroxide and nitric acid in sulfuric acid. Otherwise, the heat-expandable graphite can also be produced by reduction treatment of graphite. The reduction is conducted, for example, by treatment with sodium naphthalenide in an aprotic organic solvent, or the like method.

The particle size of the heat-expandable graphite of the present invention affects the fire retardancy of the resulting polymer composition. The graphite of a preferred particle size distribution contains the particles passing through a 80-mesh sieve at a content of 20% or lower by weight, more preferably from 1% to 20% by weight. The graphite which contains the particles passing through a 80-mesh sieve at a content of higher than 20% by weight will not give sufficient fire retardancy, while the graphite containing the above particles at a content of lower than 1% by weight would slightly impair the shape-retaining properties of the resin composition when the resin composition is exposed to fire.

The heat-expandable graphite has preferably a particle size larger than a certain level as mentioned above. In a preferred embodiment, the surface of the heat-expandable graphite particles is treated with a silane-coupling agent, or a titanate-coupling agent in order to prevent the adverse effects of larger particles on the properties of the polymer composition.

The heat-expandable graphite, which is produced by oxidation in sulfuric acid or the like process as described above, can be slightly acidic depending on the process conditions. When the graphite is acidic, corrosion of the apparatus for production or processing of the polymer composition can be inhibited by addition of an alkaline substance such as magnesium and aluminum hydroxide to the composition. The alkaline substance is preferably to be close to the heat-expandable graphite particles for efficient corrosion prevention. For this purpose, the alkaline substance is preferably mixed with the heat-expandable graphite preliminarily to adhere to the surface of the graphite. The alkaline substance is added in an amount of less than 10% by weight of the heat-expandable graphite.

Component C in the present is a metal oxide. The metal oxide is not particularly limited, provided that it is synergistic with the heat-expandable graphite as Component B. The metal oxide specifically includes oxides and complex oxides of antimony, bismuth, zirconium, molybdenum, tungsten, boron (excluding borax), aluminum, magnesium (excluding magnesium oxide for polyolefins and/or polystyrenes as the polymer), and zinc (hereinafter referred to simply as a "metal oxide").

More preferably, in the case where the polymer is selected from polyolefins, polystyrenes, and mixtures of one or more thereof, the metal oxide includes antimony trioxide, antimony pentoxide, sodium antimonate, zirconium-antimony complex oxide, bismuth trioxide, molybdenum trioxide, molybdate salts, tungsten trioxide, boron oxide, borate salts (excluding borax), aluminum oxide, and mixtures of two or more thereof. In the case where the polymer is selected from elastomers, polyurethanes, polysiloxanes, and mixtures of two or more thereof, the metal oxide includes antimony trioxide, antimony pentoxide, sodium antimonate, zirconium-antimony complex oxide, bismuth trioxide, molybdenum trioxide, molybdate salts, tungsten trioxide, boron oxide, borate salts (excluding borax), aluminum oxide, magnesium oxide, and mixtures of two or more thereof.

Of the molybdate salts, ammonium octamolybdate is particularly preferred. Of the borate salts, zinc borate and barium metaborate are particularly preferred. However, borax is not suitable since it impairs the water resistance of the polymer composition owing to its high water-solubility (14 g/100 g at 55° C.). In the case where the polymer is one or a mixture of two or more of polyolefins and polystyrenes, magnesium oxide is not preferred since it is not sufficiently synergistic with heat-expandable graphite.

The aforementioned metal oxides have been regarded as being little effective for polymers containing no halogen, although-they are known to be synergistic with halogen-type fire retardants.

Japanese Patent Laid-Open Publication 62-275138, for example, discloses application, to polyolefins, of a combination of graphite and a non-halogen type fire-retardant such as metal oxide hydrate. The non-halogen type fire-retardant is exemplified by antimony trioxide, antimony pentoxide, aluminum oxide, and zinc borate. In the disclosure, although expandable graphite (supplied by Kobayashi Shoji K.K.) is used as the graphite in Examples 2 and 5, only a combination of magnesium hydroxide with red phosphorus is used as the non-halogen type fire-retardant, but the use or antimony trioxide, antimony pentoxide, aluminum oxide, and zinc borate is not mentioned at all. Therefore, these compounds have not been known to be synergistic effectively with heat-expandable graphite.

Japanese Patent Laid-Open Publication 55-62988 discloses a fire retardation technique by use of a combination of heat-expandable graphite and zinc borate or barium borate for fire retardation of polyethylenes, polystyrenes, natural rubbers and the like. This technique, however, requires essentially an inorganic water-containing compound like aluminum hydroxide, magnesium hydroxide, and borax.

Therefore, the fact is not predictable at all that the metal oxides including antimony trioxide, antimony pentoxide, aluminum oxide, and zinc borate constituting the present invention are synergistic with heat-expandable graphite without the aid of a fire-retardant additive of other category such as magnesium hydroxide.

In the composition of the present invention, Component B and Component C are used respectively in an amount of from 1 to 30 parts by weight to 100 parts by weight of Component A. With the respective amounts of Component B and Component C of one part by weight or less, the fire retardancy of the polymer is not sufficient, while with the respective amounts thereof of 30 parts by weight or more, the rate of increase of the fire retardancy becomes lower, and the polymer properties are impaired.

The polymer composition of the present invention may further contain another fire retarding additive such as a metal hydroxide like magnesium hydroxide or aluminum hydroxide, or a phosphorus compound such as ammonium polyphosphate in such an amount that the effect of the present invention is not impaired. Further, the polymer composition may contain other kinds of additive such as inorganic fillers, colorants, antioxidants, light stabilizers, light absorbing agents, plasticizers, process oils, crosslinking agents, and blowing agents, if necessary. The polymer may be crosslinked by water-crosslinking or ionizing radiation.

The present invention provides a fire-retardant polymer composition without zed phosphorus by use of heat-expandable graphite and a novel synergist.

The present invention is described below more specifically by reference to example without limiting the invention in any way.

In Examples and Comparative Examples, the materials used are as below ("parts" is based on weight unless otherwise mentioned):

Component A
(A1) Ethylene-vinyl acetate copolymer (Ultrathene 630, Tosoh Corp.)
(A2) Low-density polyethylene (Petrothene 202, Tosoh Corp.)
(A3) Polypropylene (Tosoh Polypropylene J7250B, Tosoh Corp.)
(A4) HIPS (HT-65, Mitsubishi Kagaku K.K.)
(A5) ABS (Toyolack 100, Toray Industries, Inc.)

(A6) Compound produced by roll-blending:
100 parts of natural rubber (RSS-3 from Malaysia) as the base material, 2.5 parts of sulfur, 5 parts of zinc white (Sakai Chemical Industry Co.), 2 parts of stearic acid, 75 parts of hard top clay (Shiraishi Calcium K.K.), 1.25 parts of Accelerator CZ (Nocceler CZ, Ouchi Shinko K.K.), 0.3 part of Accelerator TT (Nocceler TT, Ouchi Shinko K.K.), 1 part of age resister (Nocrack-810A, Ouchi Shinko K.K.)

(A7) Compound produced by roll-blending:
100 parts of SBR (Sorprene, Asahi Chemical Industry Co.) as the base material, 6 parts of sulfur, 2 parts of zinc white (No.1, Sakai Chemical Industry Co.), 2.5 parts of stearic acid, 55 parts of white carbon (Nip Sil VN3, Nippon Silica K.K.), 20 parts of naphthene oil (Diana Process Oil, Idemitsu Kosan K.K.), 5.5 parts of diethylone glycol, 1.7 parts of Accelerator DM (Nocceler DM, Ouchi Shinko K.K.), 0.6 part of Accelerator D (Nocceler D, Ouchi Shinko K.K.), 1 part of age resister (Nocrack-SP, Ouchi Shinko K.K.)

(A8) Compound produced by blending:
100 parts of polyetherpolyol (MN-3050, Mitsui Toatsu Chemicals, Inc.), 55 parts of tolylene diisocyanate (T-80, Nippon Polyurethane Industry Co.), 4 parts of water, 0.3 part of triethylenediamine (Tosoh Corp.), 0.2 part of N-ethylmorpholine (NEM, Nippon Nyukazai K.K.), 0.35 part of Neostan dioctate (U-28, Nitto Kasei K.K.), 1.2 parts of silicone foam stabilizer (L-580, Nippon Unicar Co.), and 10 parts of dichloromethane (A9) Compound produced by blending:
100 parts of polymethylvinylsilicone rubber compound (KE-650, Shin-Etsu Chemical Co.), 2 parts of curing agent (C-8, Shin-Etsu Chemical Co.) containing 2,5-dimethyl-2,5-bis(t-butylperoxy)-hexane (about 25%)

Component B
(B1) Heat-expandable graphite without surface treatment (CA-60, Chuo Kasei K.K.)
(B2) Heat-expandable graphite having the surface treated with a silane coupling agent (CA-60S, Chuo Kasei K.K.)
(B3) Heat-expandable graphite mixed preliminarily with magnesium hydroxide (CA-60N, Chuo Kasei K.K.) in a mixing amount of several percent of the hydroxide to the graphite.

The expandability and the particle size distribution of Components B1 to B3 are shown in Table 1.

TABLE 1

| | Expandability[1] (mL/g) | Particle size distribution[2] (% by weight) |
|---|---|---|
| B1 | 213 | 4 |
| B2 | 208 | 4 |
| B3 | 202 | 5 |

[1] Change of specific volume on rapid heating from room temperature to 800–1000° C.
[2] Particles passing through 80-mesh sieve Component C
(C1) Antimony trioxide (Flame Cut 610R, Tosoh Corp.)
(C2) Antimony pentozide (Sun Epocb NA-1070, Nissan Chemical Industries, Ltd.)
(C3) Zinc borate (ZB223, Climax Co.)
(C4) Ammonium octamolybdate (ZT03 AOM, Climax Co.)
(C5) Zirconium-antimony complex oxide (Fire DTA, Daiichi Kigenso K.K.)
(C6) Magnesium oxide (Kyowa Mag 150, Kyowa Kagaku K.K.)

EXAMPLES 1–9 AND COMPARATIVE EXAMPLES 1–8

An ethylene-vinyl acetate copolymer was used as Component A. The starting materials were blended in a formulation ratios as shown in Table 2 by roll blending. The test specimens were prepared by press molding. The fire retardancy was evaluated by measurement of the oxygen index (hereinafter referred to as "OI") according to JIS K7201, and vertical burning test according to UL-94. The results are shown in Table 2.

TABLE 2

| | Component | | | | UL-94[1] | OI (%) |
|---|---|---|---|---|---|---|
| A | B | phr | C | phr | | |
| Example | | | | | | |
| 1 | A1 | B1 | 10 | C1 | 20 | V0 | 27.5 |
| 2 | A1 | B1 | 10 | C2 | 20 | V0 | 27.5 |
| 3 | A1 | B1 | 10 | C3 | 20 | V0 | 27.5 |
| 4 | A1 | B1 | 10 | C4 | 20 | V0 | 27.5 |
| 5 | A1 | B1 | 10 | C5 | 20 | V1 | 28.0 |
| 6 | A1 | B2 | 10 | C1 | 20 | V0 | 27.5 |
| 7 | A1 | B3 | 10 | C1 | 20 | V0 | 27.5 |
| 8 | A1 | B1 | 5 | C1 | 5 | V0 | 26.0 |
| 9 | A1 | B1 | 1 | C1 | 1 | V2 | 24.5 |
| Comparative example | | | | | | |
| 1 | A1 | — | 0 | — | 0 | NR | 21.0 |
| 2 | A1 | B1 | 30 | — | 0 | NR | 24.0 |
| 3 | A1 | — | 0 | C1 | 30 | NR | 21.0 |
| 4 | A1 | — | 0 | C2 | 30 | NR | 21.5 |
| 5 | A1 | — | 0 | C3 | 30 | NR | 21.0 |
| 6 | A1 | — | 0 | C4 | 30 | NR | 22.0 |
| 7 | A1 | — | 0 | C5 | 30 | NR | 21.0 |
| 8 | A1 | B1 | 30 | C6 | 30 | NR | 24.0 |

[1]NR denotes the level below V0, V1, and V2.

In Comparative Examples 2–6, single use of Component B (heat-expandable graphite) or Component C (metal oxide) neither improved OI (oxygen index) nor results in flame retardancy in the UL burning test. On the other hand, in Examples 1–5, the same amount (30 phr) of the fire-retardant additive as in Comparative Examples 2–8 achieves remarkably high fire retardancy. Therefore, Component C is synergistic with Component B obviously. From Examples 1, 6, and 7, the surface treatment or magnesium hydroxide treatment of the heat-expandable graphite, Component B, does not affect adversely the fire retardancy. Further, for polyolefin in as Component A, magnesium oxide as Component C is not sufficiently synergistic with Component B as shown in Comparative Example 8.

EXAMPLES 10–16 AND COMPARATIVE EXAMPLE 9–17

Low density polyethylene, polypropylene, HIPS, or ABS was used as Component A. The starting materials were blended in a formulation ratios as shown in Table 3. The test specimens of the low-density polyethylene were prepared by roll blending and press molding. The test specimens of other polymers were prepared by blending by extruder and injection molding. The fire retardancy was evaluated by measurement of the oxygen index according to JIS K7201, and vertical burning test according to UL-94. The results are shown in Table 3.

TABLE 3

| | Component | | | | UL-94[1] | OI (%) |
|---|---|---|---|---|---|---|
| A | B | phr | C | phr | | |
| Example | | | | | | |
| 10 | A2 | B1 | 10 | C1 | 20 | V0 | 30.0 |
| 11 | A2 | B1 | 10 | C3 | 20 | V0 | 29.5 |
| 12 | A2 | B1 | 10 | C3 | 20 | V0 | 29.5 |
| Comparative Example | | | | | | |
| 9 | A2 | — | 0 | — | 0 | NR | 18.5 |
| 10 | A2 | B1 | 30 | — | 0 | NR | 24.0 |
| Example | | | | | | |
| 13 | A3 | B1 | 10 | C1 | 20 | V0 | 27.0 |
| 14 | A3 | B1 | 10 | C3 | 20 | V0 | 28.0 |
| Comparative Example | | | | | | |
| 11 | A3 | — | 0 | — | 0 | NR | 19.0 |
| 12 | A3 | B1 | 30 | — | 0 | NR | 23.5 |
| Example | | | | | | |
| 15 | A4 | B1 | 10 | C4 | 20 | V0 | 31.0 |
| Comparative Example | | | | | | |
| 13 | A4 | — | 0 | — | 0 | NR | 18.5 |
| 14 | A4 | B1 | 30 | — | 0 | NR | 24.0 |
| 15 | A4 | B1 | 33 | C6 | 30 | NR | 24.0 |
| Example | | | | | | |
| 16 | A5 | B1 | 10 | C3 | 20 | V0 | 30.5 |
| Comparative Example | | | | | | |
| 16 | A5 | — | 0 | — | 0 | NR | 18.5 |
| 17 | A5 | B1 | 30 | — | 0 | NR | 24.0 |

[1]NR denotes the level below V0, V1, and V2.

For these polymers, Components C have the synergistic effect obviously. For polystyrene as Component A, magnesium oxide as Component C is not synergistic with Component B as understood from Comparative Example 15.

EXAMPLES 17–20 AND COMPARATIVE EXAMPLE 18–21

Natural rubber or SBR was used as the elastomer. The starting materials were blended in a formulation ratios as shown in Table 3. The test specimens were prepared by blending by a roll and curing by compression molding. The resulting elastomer compositions were evaluated for fire retardancy by the oxygen index according to JIS 7201, and smoke emitting properties by the NBS method in the flame mode. The results are shown in Table 4. In the table, smoke emitting properties are represented by maximum value of the smoke density ($D_{max}$).

TABLE 4

| | Component | | | | OI (%) | $D_{max}$ |
|---|---|---|---|---|---|---|
| A | B | phr | C | phr | | |
| Example | | | | | | |
| 17 | A6 | B1 | 15 | C1 | 15 | 24.6 | 132 |
| 18 | A6 | B1 | 15 | C6 | 15 | 25.0 | 123 |

TABLE 4-continued

| | Component | | | | | OI | |
|---|---|---|---|---|---|---|---|
| | A | B | phr | C | phr | (%) | $D_{max}$ |
| Comparative Example | | | | | | | |
| 18 | A6 | — | 0 | — | 0 | 20.2 | 213 |
| 19 | A6 | B1 | 30 | — | 0 | 22.4 | 174 |
| Example | | | | | | | |
| 19 | A7 | B1 | 15 | C1 | 15 | 24.6 | 186 |
| 20 | A7 | B1 | 15 | C6 | 15 | 24.2 | 144 |
| Comparative Example | | | | | | | |
| 20 | A7 | — | 0 | — | 0 | 19.7 | 304 |
| 21 | A7 | B1 | 30 | — | 0 | 22.0 | 212 |

Table 4 shows that the fire retardant elastomer compositions of Examples have excellent fire retardancy and extremely low smoking properties in comparison with those of Comparative Examples.

EXAMPLES 21–22 AND COMPARATIVE EXAMPLES 22–23

Polyurethane compositions were prepared by blending and reacting the starting materials in a formulation ratios shown in Table 5 at room temperature to form the test specimens. The resulting polyurethane compositions were evaluated for fire retardancy according to FMVSS-302, and smoke emitting properties by the NBS method in the flame mode. The results are shown in Table 5.

TABLE 5

| | Component | | | | | Burning length | |
|---|---|---|---|---|---|---|---|
| | A | B | phr | C | phr | (cm) | $D_{max}$ |
| Example | | | | | | | |
| 21 | A8 | B1 | 10 | C1 | 15 | 24 | 39 |
| 22 | A8 | B1 | 10 | C3 | 15 | 26 | 32 |
| Comparative Example | | | | | | | |
| 22 | A8 | — | 0 | — | 0 | Burned | 61 |
| 23 | A8 | B1 | 15 | — | 0 | Burned | 54 |

Table 5 shows that the fire retardant polyurethane compositions of Examples have excellent fire retardancy and extremely low smoking properties in comparison with those of Comparative Examples.

EXAMPLES 23–24 AND COMPARATIVE EXAMPLES 24–25

Polymethylvinylsiloxane rubber compounds as the polysiloxane were prepared by blending the starting materials in a formulation ratios shown in Table 6 by a roll, and then curing the blended matter by compression molding to form the test specimens. The resulting polysiloxane compositions were evaluated for fire retardancy according to JIS K7201, and smoke emitting properties by the NBS method in the flame mode. The results are shown in Table 6.

TABLE 6

| | Component | | | | | OI | |
|---|---|---|---|---|---|---|---|
| | A | B | phr | C | phr | (%) | $D_{max}$ |
| Example | | | | | | | |
| 23 | A9 | B1 | 20 | C1 | 10 | 35.5 | 93 |
| 24 | A9 | B1 | 15 | C3 | 5 | 39.5 | 141 |
| Comparative Example | | | | | | | |
| 24 | A9 | — | 0 | — | 0 | 27.2 | 233 |
| 25 | A9 | B1 | 15 | — | 0 | 29.5 | 197 |

Table 6 shows that the fire retardant polysiloxane compositions of Examples have excellent fire retardancy and extremely low smoking properties in comparison with those of Comparative Examples.

What is claimed is:

1. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is an oxide or a complex oxide containing one or more metals selected from the group consisting of antimony, bismuth, zirconium, molybdenum, tungsten, magnesium, and zinc.

2. The fire-retardant polymer composition according to claim 1, wherein the heat-expandable graphite has particle size distribution in which not more than 20% by weight of the particles pass through a 80 mesh sieve.

3. The fire-retardant polymer composition according to claim 1, wherein the metal oxide is one or more selected from the group consisting of antimony trioxide, antimony pentoxide, sodium antimonate, zirconium-antimony complex oxide, bismuth trioxide, molybdenum trioxide, molybdate salts, tungsten trioxide, boron oxide, borate salts, excluding borax, aluminum oxide, and magnesium oxide.

4. The fire-retardant polymer composition according to claim 3, wherein the heat-expandable graphite has a particle size distribution in which not more than 20% by weight of the particles pass through a 80 mesh sieve.

5. The fire-retardant polymer composition according to claim 3, wherein the molybdate salt is used and it is ammonium octamolybdate.

6. The fire-retardant polymer composition according to claim 5, wherein the heat-expandable graphite has a particle size distribution in which not more than 20% by weight of the particles pass through a 80 mesh sieve.

7. The fire-retardant polymer composition according to claim 3, wherein the borate salt is used and it is zinc borate, barium metaborate, or a mixture thereof.

8. The fire-retardant polymer composition according to claim 7, wherein the heat-expandable graphite has a particle size distribution in which not more than 20% by weight of the particles pass through a 80 mesh sieve.

9. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is an oxide or a complex oxide containing one or more metals selected from the group consisting of antimony, bismuth, zirconium, molybdenum, tungsten, and zinc, wherein the heat-expandable graphite is surface-treated with one or more coupling agents selected from silane-coupling agents or titanate-coupling agents.

10. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is an oxide or a complex oxide containing one or more metals selected from the group consisting of antimony, bismuth, zirconium, molybdenum, tungsten, and zinc, wherein the heat-expandable graphite is mixed preliminarily with magnesium hydroxide and/or aluminum hydroxide.

11. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is one or more selected from the group consisting of antimony trioxide, antimony pentoxide, sodium antimonate, zirconium-antimony complex oxide, bismuth trioxide, molybdenum trioxide, molybdate salts, tungsten trioxide and magnesium oxide and wherein the heat-expandable graphite is surface-treated with one or more coupling agents selected from silane-coupling agents or titanate-coupling agents.

12. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is ammonium octamolybdate and wherein the heat-expandable graphite is surface-treated with one or more coupling agents selected from silane-coupling agents or titanate-coupling agents.

13. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is an oxide or a complex oxide containing one or more metals selected from the group consisting of antimony, bismuth, zirconium, molybdenum, tungsten, and zinc, wherein the heat-expandable graphite has particle size distribution in which not more than 20% by weight of the particles pass through an 80 mesh sieve, and wherein the heat-expandable graphite is surface-treated with one or more coupling agents selected from silane-coupling agents or titanate-coupling agents.

14. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is one or more metal oxides selected from the group consisting of antimony trioxide, antimony pentoxide, sodium antimonate, zirconium-antimony complex oxide, bismuth trioxide, molybdenum trioxide, molybdate salts, tungsten trioxide and magnesium oxide and wherein the heat-expandable graphite is preliminarily mixed with magnesium hydroxide and/or aluminum hydroxide.

15. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is ammonium octamolybdate and wherein the heat-expandable graphite is preliminarily mixed with magnesium hydroxide and/or aluminum hydroxide.

16. A fire-retardant polymer composition which contains no halogen and which consists of the components:

(A) 100 parts by weight of a polymer, (B) 1 to 30 parts by weight of heat-expandable graphite, and (C) 1 to 30 parts by weight of a metal oxide, wherein the polymer (A) is selected from the polyurethanes; the heat-expandable graphite (B) changes in specific volume thereof on rapid heating from room temperature to 800–1000° C. by 100 ml/g or more; and the metal oxide (C) is an oxide or a complex oxide containing one or more metals selected from the group consisting of antimony, bismuth, zirconium, molybdenum, tungsten, and zinc, wherein the heat-expandable graphite has a particle size distribution in which not more than 20% by weight of the particles pass through an 80 mesh sieve and wherein the heat-expandable graphite is preliminarily mixed with magnesium hydroxide and/or aluminum hydroxide.

* * * * *